United States Patent Office 3,538,187
Patented Nov. 3, 1970

---

3,538,187
POLYESTER RESIN FROM A MIXTURE OF DIHYDRIC ALCOHOLS
Joseph Feltzin, Wilmington, Del., assignor to Atlas Chemical Industries, Inc., Wilmington, Del., a corporation of Delaware
No Drawing. Filed Mar. 4, 1969, Ser. No. 808,541
Int. Cl. C08f *21/00;* C08g *17/10*
U.S. Cl. 260—861          15 Claims

---

ABSTRACT OF THE DISCLOSURE

Polyester resins are prepared by esterification of a mixture of dihydric alcohols comprising an oxyalkylene ether of an alkylidene diphenol and a cyclo-alkanediol with a dibasic acid which comprises as a major fraction thereof an $\alpha,\beta$-unsaturated dicarboxylic acid. The polyesters are copolymerizable with ethylenically unsaturated compounds capable of free radical polymerization.

---

This invention relates to polyester resins. More particularly, this invention relates to polyester resins which are copolymerizable with vinyl-type monomers to provide resins which are highly resistant to oxidative and solvent degradation.

It is an object of this invention to provide novel polyester resins that are copolymerizable with vinyl-type monomers to provide improved corrosion resistant copolymers.

It is another object of this invention to provide copolymer resins having significantly improved resistance to oxidative and solvent degradation.

It is another object of this invention to provide a method for the preparation of improved corrosion resistant copolymer resins.

The foregoing objects and still further objects of the invention are achieved in accordance with the method thereof by providing polyester resins which are the reaction product, in substantially stoichiometric proportions, of two different dihydric alcohols with suitable dicarboxylic acid, at least a major portion of which comprises an $\alpha,\beta$-unsaturated dicarboxylic acid. More specifically, a dihydric alcohol which is an oxyalkylene ether of selected alkylidene diphenols is combined in suitable proportion with a second dihydric alcohol, specifically, a cycloalkanediol, and esterified with an approximately stoichiometric quantity of dicarboxylic acid, at least about 80 mol percent of which comprises an $\alpha,\beta$-unsaturated dicarboxylic acid. The resulting polyester resin product may be copolymerized with vinyl-type monomer to form a useful highly corrosion-resistant, cross-linked copolymeric material.

The said oxyalkylene ether of an alkylidene diphenol which is used to prepare the polyester component of the corrosion resistant resins of the present invention conforms to the following generalized chemical formula:

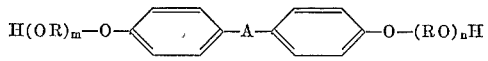

wherein A is a 2-alkylidene radical having from 3 to 4 carbon atoms, R is an alkylene radical containing from 2 to 4 carbon atoms, m and n are each at least one and the average sum of m and n does not exceed 20.

Dihydric alcohols conforming to the above formula may be prepapred by the direct addition of alkylene oxide to alkylidene diphenols or by reacting of olefin halohydrin with an alkylidene diphenol as disclosed in U.S. Pat. No. 2,331,265, hereby incorporated by reference. Methods for performing the reactions are well known in the art, and it is not necessary to describe such reactions in detail for they do not constitute the subject of this invention. It should be noted, however, that in mixtures of alcoholic and phenolic hydroxyl compounds, the alkylene oxides react preferentially with phenolic hydroxyl groups. Therefore, when a substantial molar excess of alkylene oxide is reacted with an alkylidene diphenol, both phenolic hydroxyls are etherified and the stated requirement that both $m$ and $n$ equal at least one is met.

In those cases in which a large number of mols of alkylene oxide are reacted with each mol of alkylidene diphenol there is a random distribution of the oxyalkylene groups between the two hydroxy ether groups and in this specification, the alkylene oxide derivatives of alkylidene diphenols will be referred to generically as polyoxyalkylene ($m+n$) ethers of diphenol containing an average of ($m+n$) oxyalkylene groups per mol. $m+n$ is the total number of oxyalkylene groups per mol. If $m+n$ is less than 10, the resulting polyester resin, after esterification, tends to be a rigid type of polyester. If $m+n$ is greater than 10 but not greater than 20, the resulting polyester resin tends to be a flexible type of polyester resin. If $m+n$ is greater than 20, the resulting polyester resin tends to be low in cross-linking ability and, when blended with a rigid polyester resin, tends to act as an unreactive plasticizer which lowers the tensile strength of the rigid resin without a comparable increase in percent elongation at break. Therefore, it is preferred that the sum of $m+n$ should not exceed 20.

In preparing the polyoxyalkylene ethers of alkylidene diphenols, the alkylene oxide groups may be supplied by ethylene oxide, propylene oxide, butylene oxide, or their equivalent halohydrins. It is generally preferred that the polyoxyalkylene ether contain an oxyalkylene group other than oxyethylene groups because oxyethylene compounds tend to form polyester resins which have poor water resistance, though they may be used to prepare polyester resins when weather resistance is not of great importance. Among the dihydric alcohols which conform to the formula given above which are useful in the preparation of polyester resins in accordance with this invention are specifically 2,2-di-(4-$\beta$-hydroxyethylphenyl)propane, 2,2-di-(4-hydroxypropoxyphenyl)butane, the polyoxyethylene ether of 2-butylidene diphenol wherein both phenolic hydroxyls are oxyethylated and the average number of oxyethylene groups per mol is 2.6, the polyoxypropylene ether of isopropylidene diphenol wherein both phenolic hydroxyls are oxypropylated and the average number of oxypropylene groups per mol is 2.5. Still further examples of the oxyalkylene ethers of alkylidene diphenols which may be used are polyoxypropylene(10) isopropylidene diphenol, polyoxypropylene(20)isopropylidene diphenol, polyoxyethylene(5)isopropylidene diphenol, polyoxyethylene(15) 2-butylidene diphenol, polyoxybutylene(9)isopropylidene diphenol, polyoxybutylene(6) 2-butylidene diphenol and polyoxypropylene(8) 2-butylidene diphenol, wherein the number in parentheses represents the avarage sum of $m$ and $n$ in the generic formula for such oxyalkylene ethers given above.

The cycloalkanediol which is a component of the diol mixture used in accordance with the present invention to prepare the polyester component of corrosion-resistant copolymer resins is characterized by the following generalized formula:

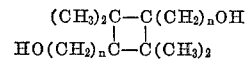

wherein $n$ is selected from the integers 0 and 1. 2,2,4,4-tetramethyl-1,3-cyclobutanediol may be prepared by condensing isobutyraldehyde to obtain the corresponding dione, with subsequent reduction of the last-named compound to the diol. 2,2,4,4-tetramethyl-1,3-di(hydroxymethyl)cyclobutane may be prepared by condensing 2,2,4,4-tetramethyl-1,3-cyclobutanedione with formaldehyde with subsequent dehydration and reduction of the condensation product to the diol. The above-identified cycloalkanediols are known and available in commercial channels.

In the preparation of the polyester resin component of the present invention, there is reacted with suitable dicarboxylic acid a mixture of the previously described dihydric alcohols which comprises at least as much as about 10% by weight of the mixture of the cycloalkanediol component and not less than about 90% by weight of the alkylidene diphenol oxyalkylene ether component. Use of less than about 10% by weight of the cycloalkanediol comopnent in the diol mixture results in resins which do not exhibit the improved corrosion-resistant characteristics desired. Moreover, the diol mixture used to prepare the polyester resin component of the present invention comprises not more than about 75% by weight of the mixture of the cycloalkanediol component, since use of a diol mixture comprising more than about 75% by weight of the cycloalkanediol component results in a polyester resin which cannot be satisfactorily copolymerized with vinyl or vinylidene monomer by reason of its substantial immiscibility therewith. Accordingly, in accordance with this invention, the mixture of dihydric alcohols reacted with suitable dibasic acid as set forth above comprises the respective alcohols in a ratio of from about 1 part by weight to about 30 parts by weight of the cycloalkanediol to each 10 parts by weight of oxalkylene ether of alkylidene diphenol.

The dicarboxylic acids which may be used to prepare the polyester resins of the invention comprise as a major component thereof ethene dicarboxylic acid having $\alpha,\beta$-unsaturation as exemplified by maleic acid, fumaric acid, itaconic acid, citraconic acid, mesaconic acid, methylene tetrahydrophthalic acid and the anhydrides thereof. A minor proportion of other dicarboxylic acids may be used as exemplified by phthalic acid and its anhydride, succinic acid, adipic acid, sebacic acid, isophthalic acid, or teraphthalic acid, and the like. Mixtures of the acids and their anhydrides may be used.

The dicarboxylic acid reacted with mixed diols to produce the polyester resin component of this invention is necessarily comprised by not less than about 80 mol percent of the above described $\alpha,\beta$-unsaturated dicarboxylic acid, for less than that proportion of such acid reacted with the mixed diol will result in resins which do not satisfactorily copolymerize with styrene to yield resins having the desired corrosion resistant characteristics.

Preferably, although not necessarily in all cases, known esterification catalysts may be used to hasten the esterification reaction. Such catalysts include organic peroxides, stannic halides, cobalt nitrate, and the like. If desired, a small proportion, say from about 0.01% to about 1% by weight, of a polymerization inhibitor is preferably although not necessarily incorporated into the reaction mixture. Such inhibitors comprise hydroquinone, pyrogallol or the like and tend to minimize double bond polymerization during esterification.

In accordance with the present invention, the polyester resin component thereof may be prepared by the introduction of substantially stoichiometrically equivalent quantities of the dicarboxylic acid and the mixed diol into a reaction vessel provided with means for agitation, means for maintaining an inert atmosphere in the vessel and means for applying vacuum. The reactants are heated together under agitation in an inert atmosphere at first at moderate temperatures and at substantially atmospheric pressure to minimize the loss of the more volatile components by distillation and finally, more strongly and under reduced pressure to drive the polyesterification to the desired extent.

The following are specific examples of the preparation of the polyester resin component of the present invention:

EXAMPLE 1

312 grams of 2.2-prodendro bisphenol A [polyoxypropylene(2.2)isopropylidene diphenol] and 54 grams of 2,2,4,4-tetramethylcyclobutane-1,3-diol are introduced at room temperature into a one-liter, round bottom flask, fitted for stirring, heating, distillation, addition of reactants and maintenance of an inert gas atmosphere. After sweeping the flask with nitrogen, slow stirring and heating (mantle) is begun. 0.26 gram of Tequinol (technical grade hydroquinone) are then added. Then after slow addition of 145 grams of fumaric acid is begun, distillation starts at 198° C. After reaching cooking temperature at 210° C., the mixture is heated under nitrogen with stirring for 8¾ hours, the acid number being determined after cooking 4 hours, 6 hours, 7 hours, 8 hours and then on the final product resin. Vacuum is applied to the system and the heating stopped about 25 minutes before the end of the cook. The resin is then poured into a flat aluminum tray to cool and harden. Subsequently, the resin is broken up and ground.

The final acid number may be determined to be 20.88, the final softening point may be determined to be 107° C., the solution clarity in 50–50% solution by weight of the resin in styrene may be determined to be a hazy yellow amber, the viscosity of the same solution is found to be 640 centipoises and the density of the same solution and is found to be 8.568 pounds per gallon.

EXAMPLE 2

249 grams of 2.2-prodendro bisphenol A and 101 grams of 2,2,4,4-tetramethylcyclobutane-1,3-diol are introduced at room temperature into a one-liter round bottom flask fitted for stirring, heating, distillation, addition of reactants and maintenance of an inert gas atmosphere.

After sweeping the flask with nitrogen, slow stirring and heating are begun and 0.26 gram of a technical grade of hydroquinone is added. Thereafter, slow addition of 163 grams of fumaric acid is begun and distillation starts at 198° C. After reaching cooking temperature (210° C.) the mixture is heated under nitrogen with stirring for 8 hours. Vacuum is applied to the system and heating stopped at about 25 minutes before the end of the cook. The resin is then poured into a flat aluminum tray to cool, harden and subsequently broken up and ground. The final acid value of the resinous product may be determined to be 31.12, the final softening point of the resin may be determined to be 118° C., the clarity of a 50–50% solution by weight of the resin in styrene may be determined to be a hazy amber color, the viscosity of the same solution may be determined to be 1120 centipoises and the density of the solution may be determined to be 8.555 pounds per gallon.

The polyesters of the present invention are copolymerizable with ethylenically unsaturated compounds capable of free radical polymerization including particularly, compounds ethylenically unsaturated at a terminal carbon atom such as those containing the vinylidene radical or, more specifically, the vinyl radical. Exemplary of such compounds are acrylic acid and the esters thereof, acrylamide, methacrylic acid and the esters thereof, methacrylamide, vinyl chloride, vinyl acetate, esters of alkyl alcohol, particularly dibasic acid esters thereof, styrene, divinylbenzene and vinyl pyridine. Since the polyester resins may be blended with aromatic compounds, such as styrene, to form an easily handled solution, copolymerization products of the polyester resins and aromatic compounds are of particular interest. The high degree of compatibility between said polyester resins and aromatic compounds permits compounding over a wide range of concentrations. In fact, copolymers may be formed from styrene and the polyester resins of this invention which contain as much as 95% styrene or as little as 5% styrene by weight, low copolymers containing from about 30 to about 70% by weight of styrene are generally more useful. Aromatic vinyl solutions containing the polyester resins of this invention may be cured using methods well known in the art to an elastic, or rigid, cross-linked copolymeric material, depending upon the particular polyester used. Two or more of the polyester resins of this invention may be blended with aromatic vinyl solution to yield a cured product having improved characteristics, such as improved impact strength, improved resistance to thermal shock, or improved corrosion-resistance over either of the polyesters used alone.

Among the many uses of the copolymeric materials of the present invention may be mentioned their use as patching compounds, flooring compounds, potting and encapsulation and many other applications.

The following are examples of the preparation of corrosion-resistant, cross-linked copolymers of polyester resins and an aromatic vinyl compound as provided in accordance with this invention:

EXAMPLE 3

The polyester resin of Example 1 is blended with styrene to form a 50% by weight of solution of the resin therein having a viscosity of about 640 cps. Casting of this solution are cured in a glass mold in a conventional manner using about 0.75 weight percent of benzoyl peroxide and heat, as by curing for about 16 to 24 hours at about 70° C., one hour at about 90° C., and one hour at about 150° C., to form a final cross-linked copolymeric composition.

EXAMPLE 4

The polyester resin of Example 2 is blended with styrene to form a 50% by weight solution of the resin therein having a viscosity of about 1120 cps. Thereafter, the resin is cured in the manner described in Example 3.

After removal from the molds, the respective copolymeric compositions may be determined to have the following properties, measured by conventional techniques familiar to those skilled in the resin art:

Table I.—Copolymer composition of Example 3

Flexural strength—15,000 p.s.i.g.
Flexural modulus—0.49×10
Barcol hardness—39–43
Heat deflection temperature—150° C.
Specific gravity—1.11
Shrinkage—7.6%

Table II.—Copolymer composition of Example 4

Flexural strength—10,000 p.s.i.g.
Flexural modulus—0.48×10
Barcol hardness—41–43
Heat deflection temperature—165° C.
Specific gravity—1.11
Shrinkage—7.7%

To test the corrosion resistance of the copolymer resins in neutral and basic media, accelerated corrosion baths are provided as follows: (1) neutral medium: 50% dioxane and 50% water; (2) basic medium: 50% dioxane, 47.5% water and 2.5% sodium hydroxide.

Samples of the respective copolymer resins are suspended in the respective baths contained in suitable vessels each equipped with refluxer and heater. The corrosion test is deemed to start when refluxing begins. Temperature is maintained at 88° C. and the test is continued for a predetermined number of hours. The Barcol hardness of the copolymer resin is taken as a measure of the degradation thereof and is measured at pre-established intervals during the test.

Comparison of the corrosion resistance characteristics in neutral and basic media of the copolymer resins of the present invention may be made with a representative corrosion-resistant commercial copolymer of styrene and a polyester of an oxyalkylene ether of an alkylidene diphenol and fumaric acid, as illustrated in Tables III and IV below:

TABLE III.—NEUTRAL MEDIUM

| Copolymer resin | Barcol hardness | | | Percent retention |
|---|---|---|---|---|
| | 0 hrs. | 145 hrs. | 244 hrs. | |
| Control resin | 35 | 2 | 0 | 0 |
| Copolymer of example 3 | 41 | 22 | 21 | 51 |
| Copolymer of example 4 | 42 | 32 | 31 | 74 |

TABLE IV.—BASIC MEDIUM

| Copolymer resin | Barcol hardness | | | Percent retention |
|---|---|---|---|---|
| | 0 hrs. | 188 hrs. | 230 hrs. | |
| Control resin | 37 | 0 | 0 | 0 |
| Copolymer of example 4 | 42 | 35 | 31 | 74 |

Although the foregoing detailed description of this invention has been set forth with reference to specific chemical materials, including specific oxyalkylene ethers of alkylidene diphenols, specific cycloalkane polyols, specific α,β-unsaturated dicarboxylic acids and specific vinyl type monomers, to specific quantities and proportions of said materials and to specific processes and steps thereof, it will be evident that equivalent chemical materials may be substituted for those described, that quantities and proportions may be modified and that processes and process steps may be altered, reversed and, in some cases, even eliminated, all within the spirit and the scope of this invention as broadly disclosed.

Having thus described my invention, I claim:

1. A curable polyester resin comprising the esterification product of a mixture of dihydric alcohols consisting essentially of an oxyalkylene ether of an alkylidene diphenol characterized by the formula:

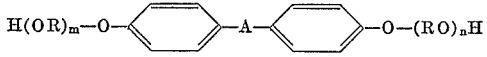

wherein A is a 2-alkylidene radical having from 3 to 4 carbon atoms, R is an alkylene radical containing from 2 to 4 carbon atoms, $m$ and $n$ are at least one and the average sum of $m$ and $n$ does not exceed 20 and a cycloalkanediol characterized by the formula:

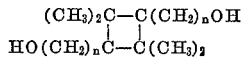

wherein $n$ is selected from the integers and 0 and 1 in a ratio of from about 1 part by weight to about 30 parts by weight of said tetramethylcyclobutanediol to each 10 parts by weight of said oxyalkylene ether with an approximately stoichiometric quantity of dicarboxylic acid, at least about 80 mol percent of which comprises and α,β-unsaturated dicarboxylic acid.

2. A polyester resin according to claim 1 wherein R is a propylene radical.

3. A polyester resin according to claim 2 wherein the average sum of $m$ and $n$ is about 2.2 and wherein said α,β-unsaturated dicarboxylic acid is fumaric acid.

4. A polyester resin according to claim 3 wherein said cycloalkanediol is 2,2,4,4-tetramethyl-1,3-cyclobutanediol.

5. A polyester resin according to claim 3 wherein said cycloalkanediol is 2,2,4,4-tetramethyl-1,3-di(hydroxymethyl)cyclobutane.

6. A composition of matter comprising a homogeneous blend consisting essentially of a vinyl compound and from about 5% by weight to about 95% by weight of an esterification product of a mixture of dihydric alcohols consisting essentially of an oxyalkylene ether of an alkylidene diphenol characterized by the formula:

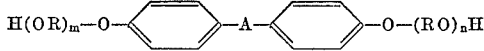

wherein A is a 2-alkylidene radical having from 3 to 4 carbon atoms, R is an alkylene radical containing from 2 to 4 carbon atoms, *m* and *n* are at least one and the average sum of *m* and *n* does not exceed 20 and a cycloalkanediol characterized by the formula:

$$(CH_3)_2C-C(CH_2)_nOH$$
$$HO(CH_2)_nC-C(CH_3)_2$$

wherein *n* is selected from the integers and 0 and 1 in a ratio of from about 1 part by weight to about 30 parts by weight of said tetramethylcyclobutanediol to each 10 parts by weight of said oxyalkylene ether with an approximately stoichiometric quantity of dicarboxylic acid, at least about 80 mol percent of which comprises an α,β-unsaturated dicarboxylic acid.

7. A composition according to claim 6 wherein said vinyl compound is styrene.

8. A composition according to claim 7 where R is a propylene radical.

9. A composition according to claim 8 wherein the average sum of *m* and *n* is about 2.2 and wherein said α,β-unsaturated acid is fumaric acid.

10. A composition of matter according to claim 9 wherein said cycloalkanediol is 2,2,4,4-tetramethyl-1,3-cyclobutanediol.

11. A composition of matter according to claim 9 wherein said cycloalkanediol is 2,2,4,4-tetramethyl-1,3-di(hydroxymethyl)cyclobutane.

12. A composition of matter according to claim 10 wherein styrene is present in amounts equal to about 50 weight percent.

13. A method of preparing a curable polyester resin which comprises the steps of reacting a mixture of dihydric alcohols consisting essentially of an oxyalkylene ether of an alkylidene diphenol characterized by the formula:

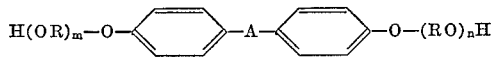

wherein A is a 2-alkylidene radical having from 3 to 4 carbon atoms, R is an alkylene radical containing from 2 to 4 carbon atoms, *m* and *n* are at least one and the average sum of *m* and *n* does not exceed 20 and a cycloalkanediol characterized by the formula:

$$(CH_3)_2C-C(CH_2)_nOH$$
$$HO(CH_2)_nC-C(CH_3)_2$$

wherein *n* is selected from the integers and 0 and 1 in a ratio of from about 1 part by weight to about 30 parts by weight of said tetramethylcyclobutanediol to each 10 parts by weight of said oxyalkylene ether with an approximately stoichiometric quantity of dicarboxylic acid, at least about 80 mol percent of which comprises an α,β-unsaturated dicarboxylic acid.

14. A method according to claim 13 wherein R is a propylene radical, the average sum of *m* and *n* is about 2.2 and said α,β-unsaturated acid is fumaric acid.

15. A method according to claim 14 wherein said cycloalkanediol is selected from the group of diol consisting of 2,2,4,4 - tetramethyl-1,3-cyclobutanediol and 2,2,4,4-tetramethyl-1,3-di(hydroxymethyl)cyclobutane.

References Cited

UNITED STATES PATENTS

| | | | |
|---|---|---|---|
| 2,856,378 | 10/1958 | Lundberg | 260—31.6 |
| 3,345,339 | 10/1967 | Parker et al. | 260—75 |

OTHER REFERENCES

Caldwell et al: Chem. Abstracts 65, 20370h (1966).
Caldwell et al.: Chem. Abstracts 66, 3017h (1967).
Caldwell et al.: Chem. Abstracts 66, 105357n (1967).

WILLIAM H. SHORT, Primary Examiner

E. A. NIELSEN, Assistant Examiner

U.S. Cl. X.R.
260—47, 75